(12) United States Patent
O'Hara

(10) Patent No.: US 12,003,423 B1
(45) Date of Patent: Jun. 4, 2024

(54) SYSTEM AND METHOD FOR SCHEDULING TRANSMISSION OF NETWORK PACKETS

(71) Applicant: Arbor Networks, Inc., Westford, MA (US)

(72) Inventor: Sean O'Hara, Saline, MI (US)

(73) Assignee: Arbor Networks, Inc., Westford, MA (US)

( * ) Notice: Subject to any disclaimer, the term of this patent is extended or adjusted under 35 U.S.C. 154(b) by 42 days.

(21) Appl. No.: 17/992,326

(22) Filed: Nov. 22, 2022

(51) Int. Cl.
*H04L 47/62* (2022.01)
*H04L 47/122* (2022.01)
*H04L 47/30* (2022.01)

(52) U.S. Cl.
CPC .......... *H04L 47/622* (2013.01); *H04L 47/122* (2013.01); *H04L 47/30* (2013.01)

(58) Field of Classification Search
CPC ...... H04L 47/622; H04L 47/122; H04L 47/30
See application file for complete search history.

(56) References Cited

U.S. PATENT DOCUMENTS

| | | | | |
|---|---|---|---|---|
| 10,320,813 B1* | 6/2019 | Ahmed | ............... | H04L 63/1416 |
| 2009/0046581 A1* | 2/2009 | Eswaran | ............... | H04L 41/147 |
| | | | | 370/230 |
| 2011/0131654 A1* | 6/2011 | Taneja | ............... | H04L 63/1441 |
| | | | | 709/224 |
| 2013/0169216 A1* | 7/2013 | Tsubouchi | ............ | H04M 15/60 |
| | | | | 320/107 |
| 2014/0304320 A1* | 10/2014 | Taneja | ................. | H04L 69/326 |
| | | | | 709/203 |
| 2018/0227229 A1* | 8/2018 | Lopez | ..................... | H04L 45/28 |
| 2021/0336875 A1* | 10/2021 | Baj | ........................ | H04L 45/74 |
| 2021/0399966 A1* | 12/2021 | Jayaraman | .......... | H04L 41/0846 |

* cited by examiner

*Primary Examiner* — Ario Etienne
*Assistant Examiner* — Kidest Mendaye
(74) *Attorney, Agent, or Firm* — Foley & Lardner LLP

(57) ABSTRACT

A computer method and system for scheduling packets for transmission over a network, via a gateway device having a packet buffer for temporarily storing packets intended for a network device. Upon reception of a packet in the gateway device intended for a network device, a determination is made as to whether the received packet is the start a new packet session for the network device. If yes, the packet is then caused to be forward to the intended network device. If no, then a determination is made as to whether drop the received packet contingent upon a determined current size of the packet buffer (e.g., does it exceed a predetermined packet size threshold value). If the packet is not dropped, then a determination is made as to whether mark the packet for network congestion control contingent upon the determined size of the packet buffer (e.g., does it exceed a predetermined network congestion packet size threshold value). The packet is then caused to be forwarded to the intended network device.

17 Claims, 2 Drawing Sheets

SYSTEM AND METHOD FOR SCHEDULING TRANSMISSION OF NETWORK PACKETS

1. FIELD

Background

The disclosed embodiments relate to the field of communications technologies, and in particular, to a method and system, and an apparatus for scheduling network transmission of packets in gateway device.

2. DESCRIPTION OF RELATED ART

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

Critical to proper operation of internet networked connections, is the scheduling of transmission data packets in such networked connections. For instance, on a node in a packet switching communication network, a network scheduler (also called a packet scheduler) is an arbiter that manages the sequence of network packets in the transmit and receive queues of the network interface controller (NIC). The network scheduler logic decides which network packet to forward next from the buffer. The buffer works as a queuing system, storing the network packets temporarily until they are transmitted.

It is to be appreciated current network schedulers residing in network equipment such as routers, gateways, and proxies use queues or buffers to store packets in computer memory which are intended to be received, processed, and sent. Since memory is a finite resource, these schedulers experience issues when the queues are filled and there are no available positions to store newly received packets. To mitigate these issues, several queue management systems are employed to decide when to drop packets for general network equipment. For instance, one of the simplest examples is Tail Drop, which drops newly arriving packets when the queue is filled to its maximum capacity and resumes queueing packets when there is room in the queue. It is noted this method distributes space in the buffer unfairly by often penalizing bursty flows and to also lead to TCP Global Synchronization. Another example of network scheduling logic is Random Early Detection (RED) which is an Active Queue Management (AQM) policy that pre-emptively drops packets before the queue becomes full. While this method addresses the issues which arise under the Tail-Drop network scheduling logic, RED is often disadvantageous in that it has several parameters that require tuning. Yet another example of network scheduling logic is Blue (SFB) and (RSFB) which randomly drops or marks a packet with Explicit Congestion Notification (ECN) before the transmit queue becomes full, and unlike RED it requires little or no tuning. As briefly explained, each of these exemplary network scheduling logic systems mentioned above seek to reduce congestion by either dropping packets or by using ECN.

It is to be appreciated and understood the aforesaid exemplary queue management systems having some type of logic scheduling generally work well for general-purpose networking devices which process all traffic they receive before forwarding it on through the network. However, they exhibit several issues when used by transparent networking devices which process traffic on a best-effort basis due to resource constraints, allowing them to achieve the highest throughput possible at the cost of not processing or partially processing a subset of the traffic. One example of such a device is a transparent TLS proxy, which will terminate, process and re-originate as many TLS sessions as possible, while forwarding on TLS sessions which would overload the system. It is to be appreciated that in the transparent TLS proxy example, each initial packet in a newly forming connection leads to several more received, processed, and have a disproportionately large impact on network congestion (often due to packet encryption required).

TLS is a cryptographic protocol that provides end-to-end security of data sent between applications over the Internet. It is mostly familiar to users through its use in secure web browsing, and in particular the padlock icon that appears in web browsers when a secure session is established. However, it is used for other applications such as e-mail, file transfers, video/audioconferencing, instant messaging and voice-over-IP, as well as Internet services such as DNS and NTP.

Given this, when a network scheduler component processes packets in TLS sessions, dropping random packets, or applying ECN, as the general network scheduler management systems do, will often result in retransmission of the packet or reduced transmission rate, either of which will degrade system performance. For instance, current network scheduler systems employing TLS decryption (AED and nDA) use priority packet queues with configurable thresholds for queue size and/or number of new connections. Thus, they suspend decryption and forward new connections when current buffer thresholds are exceeded. This can cause a significant amount of flapping which in turn creates performance issues as well as network congestion and starvation.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system, apparatus and method that utilize a network scheduler queue management system, particularly adapted for processing packets sessions using TLS protocols, which employ a flow forwarding mechanism for newly forming connections and a packet drop/mark mechanism for all other traffic. This enables the network scheduler queue management system to simultaneously achieve a highest possible network processing and throughput performance, even when TLS decryption of packets is required. Thus, the network scheduler queue management system in accordance with the illustrated embodiments utilize a packet flow forwarding mechanism, in contrast to prior art techniques relying explicitly on dropped packets and ECN for congestion control.

To achieve these and other advantages and in accordance with the purpose of the illustrated embodiments, in one aspect, described is a computer method and system for scheduling packets for transmission over a network, via a gateway device having a packet buffer for temporarily storing packets intended for a network device. Upon reception of a packet in the gateway device intended for a network device, a determination is made as to whether the received packet is the start a new packet session for the network device. If yes, the packet is then caused to be forward to the intended network device. If no, then a determination is made as to whether drop the received packet contingent upon a determined current size of the packet buffer (e.g., does it exceed a predetermined packet size threshold value). If the packet is not dropped, then a determination is made as to whether mark the packet for network congestion control contingent upon the determined size of the packet buffer (e.g., does it exceed a predetermined network congestion packet size threshold value). The packet is then caused to be forwarded to the intended network device.

BRIEF DESCRIPTION OF THE DRAWINGS

So that those skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Figure 1:
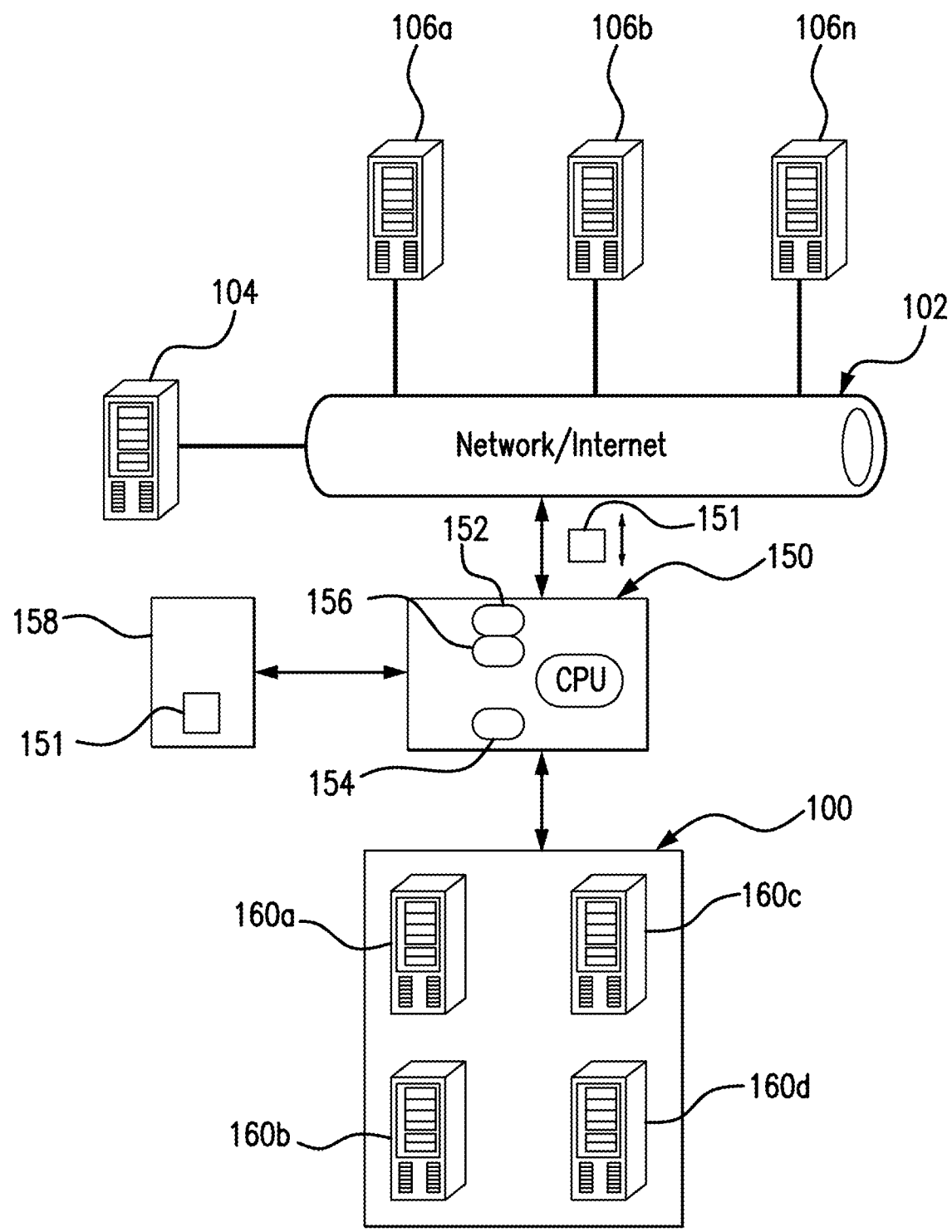
FIG. 1 is a schematic diagram showing network architecture and the relationship between a network scheduler queue management system and a monitored network according to an illustrated embodiment.

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments describe a network scheduler queue management system, apparatus and method that is preferably adapted for processing packets sessions using TLS protocols. The network scheduler queue management system, apparatus and method preferably utilizes a flow forwarding processes for newly forming TLS connections, and a packet drop/mark mechanism for all other traffic. This enables the network scheduler queue management system to simultaneously achieve a highest possible network processing and throughput performance, even when TLS decryption of packets is required.

Turning now descriptively to the drawings, in which similar reference characters denote similar elements throughout the several views, FIG. 1 illustrates the relationship between a protected network 100, a network monitoring device 150, Internet 102, and external host devices 106*a*, 106*b* . . . 106*n*, 104. In accordance with the below described illustrated embodiments, the network monitoring device 150 is integrated with a network scheduler queue management system.

In a typical implementation, the external network devices 106*a*, 106*b* . . . 106*n*, 104 (also referred to as external devices, routers or host devices) attempt to connect to protected devices 160 within the protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, network traffic from the communication network 102 to one or more monitored networks 100 is monitored by a network monitor device 150, such as the Arbor Edge Defense Perimeter Security & Defense system commercially available from NetScout Systems, Inc. The network monitor device 150 is preferably located between the Internet 102 and one or more monitored networks 100, preferably via a firewall 159. In other embodiments, the network monitor device 150 may be located within the Internet, service provider network or enterprise network rather than as a network edge as illustrated. In accordance with the illustrated embodiments, the network monitor 150 is preferably configured and operative to process network flow data, which data is utilized by network monitor device 150 to control the flow of network traffic, via network scheduling logic, to the one or more monitored networks 100. For instance, one purpose may be for providing network scheduling of packets received from the external network devices 106a, 106b . . . 106n, 104 (e.g., via queues of the network interface controllers (NICs), and particularly packets received in a TLS packet session). The network monitor device 150 preferably includes a packet buffer configured and operative to function as a queuing system that stores selected network packets temporarily until they are transmitted to devices 160 in a protected network 100.

It is to be understood and appreciated the network monitor device 150 is also preferably configured and operative to detect network attacks (e.g., DoS/DDoS), and to direct strategies for blocking such attacks using a variety of mitigation strategies. For instance, the network monitor device, in accordance with certain embodiments, is configured and operative for detecting and mitigating Denial of Service (DoS) attacks in inbound packets 151 intended for a network device 160 in a protected network, while also being configured and operative for detecting and mitigating malicious data in outbound packets sent from a network device 160 (e.g., responsive to a malicious request from an external device (104, 106).

The network monitor device 150 preferably includes a packet processing system preferably having an external high-speed network interface 152 and a protected high-speed network interface 154. Under current technology, these interfaces are capable of handling 1.0-100 Gbps, for example. The network monitor device 150 may further include processors 156 that preferably process the network packets 151 received at interfaces 152 and 154. Additionally, a central processing unit (CPU), random access memory (RAM), and a storage device 158 are preferably used to further support the processing of the received packets 151. For instance, the storage device 158 in accordance with certain illustrated embodiments includes a packet buffer component for queuing certain received packets 151 for enabling the scheduling of transmission of data packets 151 to one or more monitored networks 100 as described herein.

According to the exemplary configuration illustrated in FIG. 1, the network monitor device 150 may comprise a Client Edge (CE) device. The CE device can provide entry points into the monitored network 100. In alternative configuration, the network monitor device 150 may comprise a virtual device. In other words, at least some of the embodiments do not require the network monitor device 150 to be a physical hardware device or to be located in a particular part of the network infrastructure, as long as the network monitor device 150 can be in the path of the incoming traffic 151 to the monitored network 100. It is to be appreciated that for ease of illustration, the network monitor device 150 in the illustrated embodiment is shown coupled to a single monitored network 100. However, it is to be understood the illustrated embodiments are not to be limited to such a single monitored network 100 as the network monitor device 150 in accordance with the illustrated embodiments is to be understood to be coupled to a plurality of different monitored networks.

Figure 2:
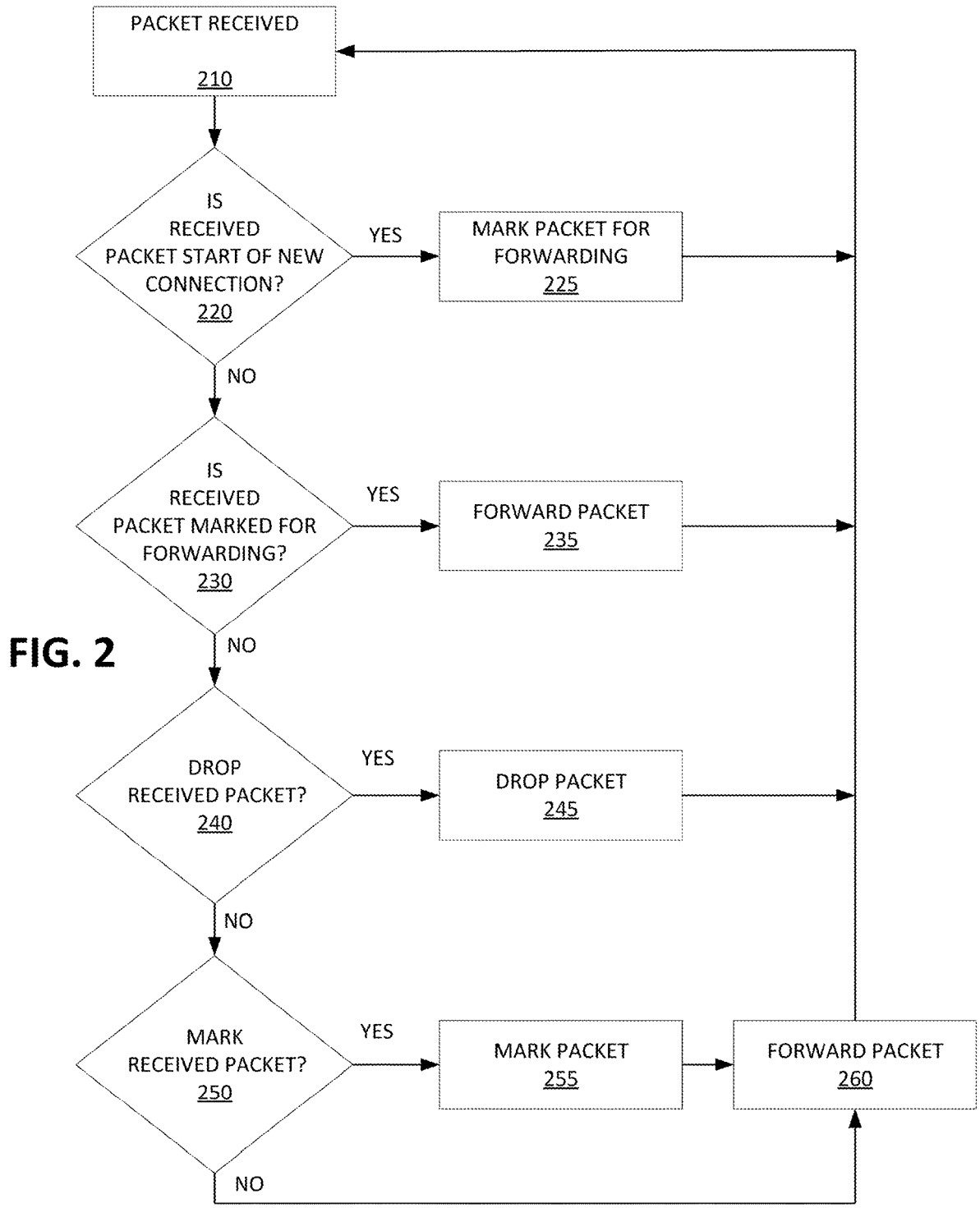
FIG. 2 is a flowchart illustrating a process for scheduling network transmission of packets in accordance with the illustrated embodiments.

Turning to FIG. 2, illustrated is an exemplary and non-limiting flowchart depicting a method for simulating the effect/efficacy of one or more flow specification rules on network traffic flowing to a monitored network in accordance with certain illustrated embodiments. Before turning to description of FIG. 2, it is noted that the flow diagram in FIG. 2 illustrates exemplary operational steps carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

It is to be appreciated that the below described embodiments generally relate to a network monitor device 150 having a network scheduler queue management system adapted for processing received packets 151 from a network, such as packets in packet sessions using TLS protocols preferably by utilizing a flow forwarding processes for newly forming TLS connections, and a packet drop/mark mechanism for all other traffic. With reference now to FIG. 2 (and with continued reference to FIG. 1) described now is an exemplary process (referenced generally by 200), utilizing network monitoring device (e.g., 150) for scheduling packets 151 received from external devices 104, 106 for transmission to a network 100.

Starting at step 210, a packet 151 is received in the monitor device 150 (e.g., via NIC interface) from an external network 102, directed to the network device 160 (e.g. a server) in a monitored network 100. Next at step 220, the monitor device 150 determines if the received packet 151 is the start of a new packet session (e.g., in a packet session having a TLS protocol intended for a network device 160). The network monitor device 150 preferably utilizes network scheduler logic for deciding which network packet to forward next from the buffer 158, which in accordance with the illustrated embodiments preferably utilizes a probabilistic algorithm for determining if the received packet 151 is the start of a new packet session, which probabilistic algorithm may be a Stochastic Fair Blue (SFB) active queue management algorithm. It is to be appreciated and understood SFB is an active queue management algorithm operative to simultaneously: bound queue length (and hence latency); minimize packet drops; maximize link utilization; be fair to reactive aggregates; reliably detect non-reactive aggregates (aggregates that don't respond to congestion control indications) and put them into a so-called penalty box—SFB doesn't require significant tuning while requiring an insignificant amount of memory for book-keeping. Briefly, SFB classifies all traffic into aggregates, whereby SFB treats each flow (TCP connection) as an aggregate, or all traffic destined to a given IP address as an aggregate, etc., such that SFB ensures that each aggregate gets its fair share of buffer space.

It is to be appreciated and understood that while the network scheduler logic used in the network monitor 150 is described with reference to utilizing SFB, it is to be understood the utilized type of network scheduler logic in the monitor device 150 is not be limited to SFB as any suitable network scheduler logic (e.g., active queue management algorithms) may be utilized, including (but not limited to): Common Applications Kept Enhanced (CAKE); Controlled Delay (CoDel); FQ-CoDel; Modified-REM (M-REM); PI controller; Random early detection (RED); Random Exponential Marking (REM); RED with Preferential Dropping (RED-PD); Robust random early detection (RRED); RSFB: a Resilient Stochastic Fair Blue algorithm against spoofing DDoS attacks; and Smart Queue Management (SQM) (combining AQM with QOS and other techniques).

If it is determined the received packet is the start of a new packet session (step 220), then at step 225 the received packet is marked by the monitor device 150 for forwarding. Next at step 230, a determination is made as to whether the packet 151 was marked for forwarding (step 225). If yes, the packet 151 is preferably forwarded to a packet queue (buffer) 158 for scheduled transmission to an intended network device 160, step 235. And if no, the received packet 151 was not determined to be the start of a new packet flow session (step 220), then at step 240 the network device 150 determines to drop (step 245) the received packet 151, preferably responsive to determining the size of the packet buffer 158 is below a packet drop threshold value (e.g., the packet forwarding buffer 158 is at, or close to, capacity).

Proceeding to step 250, if it is determined not to drop the received packet 151 (step 240), then a determination is made as whether to mark the received packet 151 for network congestion control, preferably responsive to determining the size of the packet buffer 158 exceeds a packet mark threshold value (e.g., the packet forwarding buffer 158 is nearing capacity according to a prescribed packet mark threshold value). If yes, then the received packet is marked for congestion control (step 255) and is then forwarded to the packet queue (buffer) 158 for scheduled transmission to an intended network device 160, step 260. And if the received packet 151 was determined not to be marked for congestion control (step 250) (e.g., the packet forwarding buffer 158 is not nearing capacity according to the prescribed packet mark threshold value), then the unmarked received packet 151 is also forwarded to the packet queue (buffer) 158 for scheduled transmission to an intended network device 160, step 260.

As mentioned above, the network monitor device 150 in accordance with the illustrated embodiments is further configured and operative to perform one or more network attack mitigations actions, including detecting and mitigating Denial of Service (DoS) attacks in inbound packets 151 intended for the network device 160 and/or detecting and mitigating malicious data in outbound packets sent from the network device 160.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of the present disclosure, and not in limitation thereof.

In summary, various embodiments of the present illustrated embodiments disclose a novel approach for performing network scheduling for transmission of certain received packet flows. In particular it provides simultaneous flow forwarding of newly formed packet flows, and dropping of certain other packet flows. Exemplary advantages of the illustrated embodiments include (but are not limited to) overcoming the aforesaid shortcomings associated with current flow packet transmission scheduling logic by incorporating a flow forwarding mechanism in contrast to relying explicitly on dropped packets and ECN for congestion control.

It is to be understood the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present illustrated embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of scheduling packets for transmission over a network, via a gateway device having a packet buffer for temporarily storing packets intended for a network device, comprising:
- receiving a packet at the gateway device, directed to the network device;
- determining, in the gateway device, if the received packet is the start of a new packet session for the network device;
- forwarding, by the gateway device, the received packet to the network device if determined to be start of the new packet session;
- responsive to determining a size of the packet buffer is below a packet drop threshold value, dropping, by the gateway device, the received packet if determined not to be start of a new packet session;
- marking for network congestion control, by the gateway device, the received packet if determined not to be start of a packet session and not to be dropped; and
- forwarding the marked received packet to the network device.

2. The computer-implemented method as recited in claim 1, wherein the received packet is marked for network congestion responsive to determining the size of the packet buffer exceeds a packet mark threshold value.

3. The computer-implemented method as recited in claim 2, further including forwarding the received packet to the network device if determined: not to be start of a packet session; not to be dropped; and not to be marked, responsive to determining the size of the packet buffer is below the packet mark threshold value.

4. The computer-implemented method as recited in claim 1, wherein the received packet is received from a Network Interface Controller (NIC) component.

5. The computer-implemented method as recited in claim 1, wherein the gateway device is configured for detecting and mitigating Denial of Service (DoS) attacks in inbound packets intended for the network device.

6. The computer-implemented method as recited in claim 5, wherein the gateway device is further configured for detecting and mitigating malicious data in outbound packets sent from the network device.

7. The computer-implemented method as recited in claim 1, wherein the network device is a server.

8. A computer-implemented method of scheduling packets for transmission over a network, via a gateway device having a packet buffer for temporarily storing packets intended for a network device, comprising:
- determining a size of the packet buffer;
- receiving a packet at the gateway device, directed to the network device;
- determining, in the gateway device, if the received packet is the start of a new packet session for the network device;
- forwarding, by the gateway device, the received packet to the network device if determined to be start of the new packet session; and
- dropping, by the gateway device, the received packet if determined not to be start of a new packet session responsive to determining a size of the packet buffer is below a packet drop threshold value;
- marking for network congestion control, by the gateway device, the received packet if determined not to be start of a packet session and not to be dropped, and responsive to determining the size of the packet buffer exceeds a packet mark threshold value; and
- forwarding the marked received packet to the network device.

9. The computer-implemented method as recited in claim 8, further including forwarding the received packet to the network device if determined: not to be start of a packet session; not to be dropped; and not to be marked, responsive to determining the size of the packet buffer is below the packet mark threshold value.

10. The computer-implemented method as recited in claim 9, wherein determining if the received packet is the start of a new packet session for the network device utilizes a probabilistic algorithm for determining if the received packet is the start of a new packet session; and not to be marked, responsive to determining the size of the packet buffer is below the packet mark threshold value.

11. The computer-implemented method as recited in claim 10, wherein the probabilistic algorithm is a Stochastic Fair Blue (SFB) active queue management algorithm.

12. The computer-implemented method as recited in claim 9, wherein the gateway device is configured for detecting and mitigating Denial of Service (DoS) attacks in inbound packets intended for the network device.

13. The computer-implemented method as recited in claim 12, wherein the gateway device is configured for detecting and mitigating malicious data in outbound packets sent from the network device.

14. The computer-implemented method as recited in claim 8, wherein the received packet is received from a Network Interface Controller (NIC) component.

15. The computer-implemented method as recited in claim 8, wherein the network device is a server.

16. A network computing device comprising:
- a processor;
- a network interface; and
- a memory including instructions operable to be executed by the processor to perform a set of actions to configure the processor to:
  - receive a packet at the network interface, directed to a network device;
  - determine if the received packet is the start of a new packet session for the network device;
  - forward the received packet to the network device if determined to be start of the new packet session;
  - drop the received packet if determined not to be start of a new packet session;
  - determine a size of the packet buffer, wherein the received packet is dropped to determining a size of the packet buffer is below a packet drop threshold value;
  - mark for network congestion control the received packet if determined not to be start of a packet session and not to be dropped, and responsive to determining the size of the packet buffer exceeds a packet mark threshold value; and
  - forward the marked received packet to the network device.

17. The network computing device as recited in claim 16, wherein the processor is further configured to:
- detect and mitigate Denial of Service (DoS) attacks in inbound packets directed for the network device; and
- detect and mitigate malicious data in outbound packets sent from the network device.

\* \* \* \* \*